United States Patent
Naito et al.

(10) Patent No.: US 11,507,765 B2
(45) Date of Patent: Nov. 22, 2022

(54) READING DEVICE, COMMODITY DATA REGISTRATION SYSTEM, AND PROGRAM

(71) Applicant: TOSHIBA TEC KABUSHIKI KAISHA, Tokyo (JP)

(72) Inventors: Hidehiro Naito, Mishima Shizuoka (JP); Yuki Kawaguchi, Tagata Shizuoka (JP); Shinsuke Yajima, Mishima Shizuoka (JP); Daisuke Hattori, Sunto Shizuoka (JP); Masaki Ito, Numazu Shizuoka (JP); Takahiro Saitou, Izunokuni Shizuoka (JP); Kota Suzuki, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 17/224,316

(22) Filed: Apr. 7, 2021

(65) Prior Publication Data

US 2022/0058351 A1 Feb. 24, 2022

(30) Foreign Application Priority Data

Aug. 20, 2020 (JP) .............................. JP2020-139691

(51) Int. Cl.
*G06K 7/10* (2006.01)
*G07G 1/00* (2006.01)

(52) U.S. Cl.
CPC ......... *G06K 7/109* (2013.01); *G06K 7/10198* (2013.01); *G06K 7/10584* (2013.01); *G07G 1/0081* (2013.01)

(58) Field of Classification Search
CPC .............. G06K 7/109; G06K 7/10198; G06K 7/10584; G06K 7/10732; G06K 7/10881; G06K 7/1091; G07G 1/0081; G07G 1/0018; G07G 1/12
See application file for complete search history.

(56) References Cited

U.S. PATENT DOCUMENTS

| 6,637,655 | B1 * | 10/2003 | Hudrick | G06K 7/10851 |
| | | | | 235/462.31 |
| 9,082,033 | B2 * | 7/2015 | Brock | G06K 7/10821 |
| 2016/0350563 | A1 * | 12/2016 | Ye | G06K 7/1091 |
| 2017/0134614 | A1 * | 5/2017 | Gurevich | H04N 1/40025 |

FOREIGN PATENT DOCUMENTS

JP 2016-162100 9/2016

* cited by examiner

*Primary Examiner* — Seung H Lee
(74) *Attorney, Agent, or Firm* — Amin, Turocy & Watson, LLP

(57) ABSTRACT

A reading device according to an embodiment includes a scanner configured to read code information indicated by a code symbol, a holder configured to detachably hold the scanner, a detecting unit configured to detect a first state in which the scanner is held by the holder and a second state in which the scanner is detached from the holder, and a setting-condition changing unit configured to, if the detecting unit detects the second state, set setting conditions relating to the reading by the scanner such that a reading distance of the scanner is shorter than the reading distance in the first state.

18 Claims, 7 Drawing Sheets

*FIG. 3*

|  | FIRST SETTING CONDITIONS | SECOND SETTING CONDITIONS |
|---|---|---|
| LUMINANCE VALUE OF ILLUMINATION | HIGH | LOW |
| SHUTTER SPEED | LOW | HIGH |
| CAMERA GAIN | HIGH | LOW |
| FOCAL LENGTH | FAR | NEAR |

*FIG. 7*

|  | FIRST SETTING CONDITIONS | SECOND SETTING CONDITIONS |
|---|---|---|
| OUTPUT INTENSITY | HIGH | LOW |

READING DEVICE, COMMODITY DATA REGISTRATION SYSTEM, AND PROGRAM

CROSS-REFERENCE TO RELATED APPLICATION

This application is based upon and claims the benefit of priority from Japanese Patent Application No. 2020-139691, filed on Aug. 20, 2020, the entire contents of which are incorporated herein by reference.

FIELD

Embodiments described herein relate generally to a reading device, a commodity data registration system, and a program.

BACKGROUND

There has been known a reading device that can be used either in a state in which a barcode reader including an imaging unit that captures an image of a barcode or the like attached to a commodity is fixed on a placing table or a state in which the barcode reader is detached from the placing table and held by a hand (for example, JP-A-2016-162100 (Patent Literature 1)).

If such a barcode reader is fixed to the placing table and used, a user brings the commodity close to the imaging unit, captures an image of the barcode attached to the commodity, and reads a commodity code indicated by the barcode. In this way of use, since the user does not need to hold the barcode reader, there is an advantage that, for example, the user can capture images of barcodes attached to commodities one after another using both hands and read commodity codes. On the other hand, if the user uses the barcode reader in the state in which the barcode reader is detached from the placing table, the user grips the barcode reader and directs the imaging unit to the barcode to thereby capture an image of the barcode and reads a commodity code. In this way of use, for example, if the user reads a commodity code from a barcode attached to a heavy commodity, there is an advantage that the user can read the commodity code without holding the heavy commodity.

The barcode reader is considered to be excellent in that the user can select a way of use according to a situation in which the user uses the barcode reader. However, accurate reading of information is not considered at all. With the barcode reader, for example, if the user detaches the barcode reader from the placing table and uses the barcode reader, the user sometimes erroneously reads, if a reading distance of the barcode reader is long, a barcode of another commodity which the user does not intend to read, while moving the barcode reader.

DESCRIPTION OF THE DRAWINGS

FIG. 3 is a diagram illustrating a data configuration of an imaging condition table unit of the scanner;

FIG. 7 is a diagram illustrating a data configuration of an irradiation output intensity table unit of the scanner.

DETAILED DESCRIPTION

An aspect of embodiments is to provide, in order to solve the problems described above, a reading device, a commodity data registration system, and a program capable of accurately reading information.

A reading device according to an embodiment includes: a scanner configured to read code information indicated by a code symbol; a holder configured to detachably hold the scanner; a detecting unit configured to detect a first state in which the scanner is held by the holder and a second state in which the scanner is detached from the holder; and a setting-condition changing unit configured to, if the detecting unit detects the second state, set setting conditions relating to the reading by the scanner such that a reading distance of the scanner is shorter than the reading distance in the first state.

Figure 1:
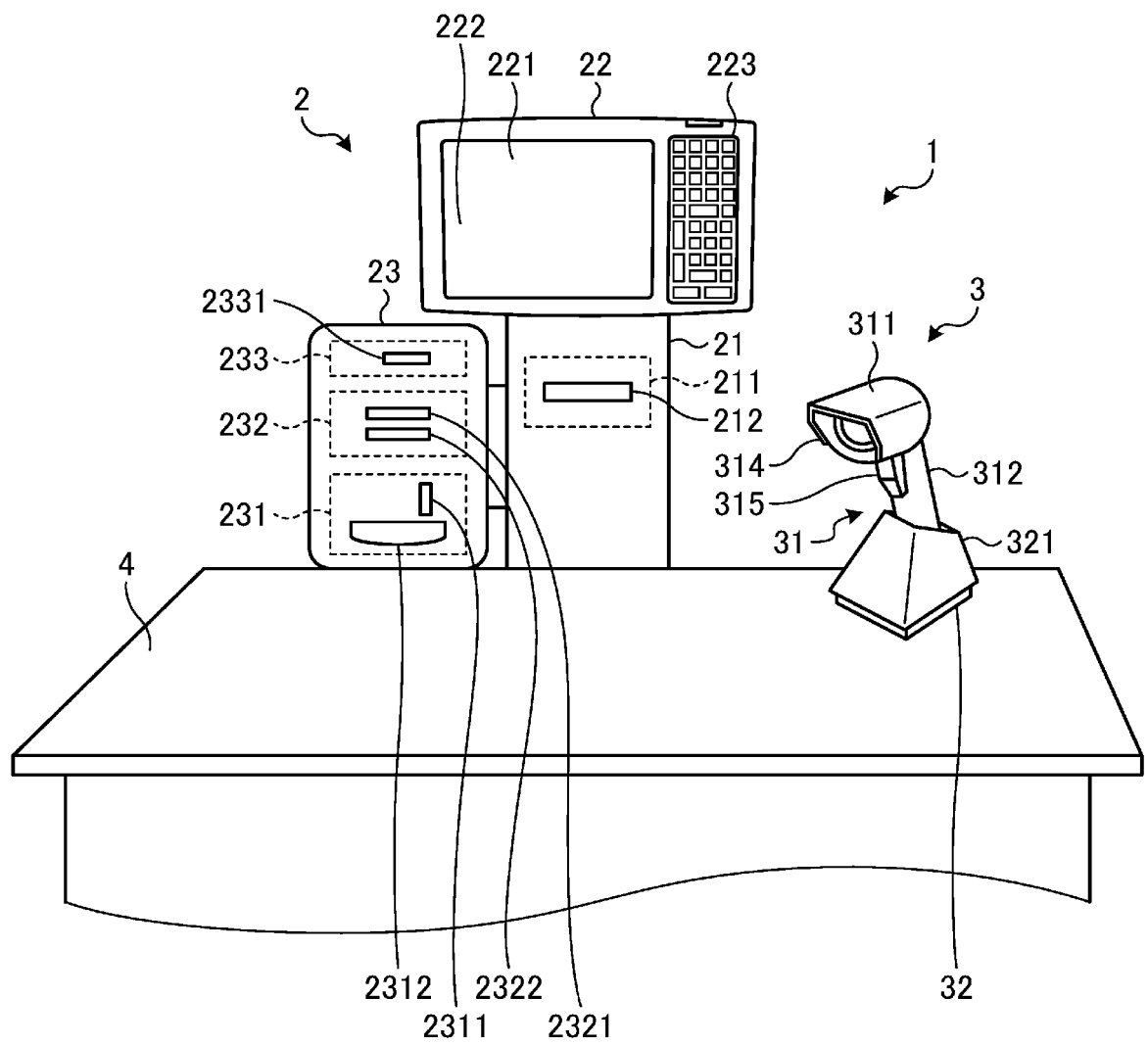
FIG. 1 is a diagram illustrating a commodity data registration system in a first embodiment.

A first embodiment is explained below with reference to the drawings. FIG. 1 is a diagram illustrating the exterior of a commodity data registration system 1 according to the first embodiment. The commodity data registration system 1 is set in a retail store such as a supermarket and includes a POS (Point Of Sales) terminal 2, a reading device 3, and a work table 4.

The POS terminal 2 is a self-service POS terminal with which a shopping customer himself or herself performs commodity registration and payment for commodities to be purchased. The POS terminal 2 acquires a commodity code for specifying a commodity read by the reading device 3 from a code symbol attached to the commodity and executes a payment process for the customer to perform payment. In this embodiment, the code symbol is explained as a barcode. However, this is an example. A two-dimensional code may be used as the code symbol. The POS terminal 2 performs commodity registration based on the commodity code acquired from the reading device 3. The POS terminal 2 is an example of a registration device. The commodity registration means temporarily storing, in order to perform the payment process, in the POS terminal 2, the acquired commodity code and/or commodity information acquired based on the commodity code. The POS terminal 2 includes a supporting unit 21, an operation display unit 22, and a depositing and dispensing unit 23.

One end of the supporting unit 21 is coupled to the work table 4. The supporting unit 21 incorporates a printer 211. The printer 211 functions as a receipt printer that prints a receipt if payment by the customer ends. In the supporting unit 21, a dispensing port 212 for dispensing the receipt printed by the printer 211 is formed.

The operation display unit 22 is attached to the upper end of the supporting unit 21. The operation display unit 22 includes a display 221, a touch panel 222, and a keyboard 223.

The display 221 is configured by a liquid crystal panel or the like. The display 221 displays various kinds of information such as information concerning registered commodities, a total amount of one transaction, and a registration button for registering a commodity not attached with a barcode.

The touch panel 222 is provided on the surface of the display 221 and inputs information corresponding to a touched position to a control unit of the POS terminal 2. For example, if the customer touches the registration button, the touch panel 222 inputs a commodity code of a commodity indicated by the registration button to the control unit of the POS terminal 2.

The keyboard 223 includes a start key for inputting a start of a transaction, a closing key for declaring to perform a closing process for the transaction and settle a price, and a settlement method selection key for selecting a settlement method such as cash settlement or various cashless settlements.

The depositing and dispensing unit 23 is a device for the customer to perform payment. The depositing and dispensing unit 23 includes a coin change machine 231, a bill change machine 232, and a card reader 233.

The coin change machine 231 includes a coin depositing port 2311 and a coin discharging tray 2312. The coin change machine 231 receives coins deposited into the coin depositing port 2311 by the customer and dispenses, to the coin discharging tray 2312, coins of change paid to the customer.

The bill change machine 232 includes a bill depositing port 2321 and a bill discharging port 2322. The bill change machine 232 receives bills deposited to the bill depositing port 2321 by the customer and discharges and dispenses, from the bill discharging port 2322, bills of change paid to the customer.

The card reader 233 reads, from a member card distributed to the customer in advance, a member ID for identifying the customer. If the customer performs credit card settlement, the card reader 233 reads credit information necessary for settlement from a credit card. These cards are inserted from an insertion port 2331. The depositing and dispensing unit 23 may include a device that reads information necessary for the other cashless settlements such as a two-dimensional code reader.

The reading device 3 reads, from a barcode attached to a commodity to be purchased by the customer, a commodity code of the commodity and outputs the commodity code to the POS terminal 2. The reading device 3 includes a scanner 31 and a holder 32. In this embodiment, the reading device 3 connected to the POS terminal 2 is explained. However, this is an example. The reading device 3 can be used in other fields.

The scanner 31 recognizes a barcode attached to a commodity from a captured image, decodes the recognized barcode, and reads a commodity code. The commodity code is an example of code information indicated by the barcode. The decoding of the barcode recognized by the scanner 31 may be performed by the control unit of the POS terminal 2. In this case, the code information indicated by the barcode is not the commodity code but is the barcode itself before the decoding.

The scanner 31 includes a main body unit 311 and a handle unit 312. The main body unit 311 incorporates an imaging unit 313 (see FIG. 2). An imaging window (hereinafter referred to as reading window as well) 314 for the imaging unit 313 to capture an image is formed in the main body unit 311. The handle unit 312 is griped by the customer if the scanner 31 is detached from the holder 32 and used. A trigger switch 315 is provided in the handle unit 312. If a commodity code is read by the scanner 31 detached from the holder 32, the trigger switch 315 is turned on by the customer who uses the scanner 31.

The holder 32 is disposed on the work table 4 and detachably holds the scanner 31. The holder 32 includes a holding unit 321 that detachably holds the lower end of the handle unit 312 of the scanner 31. The holding unit 321 is formed in a concave shape, although not illustrated in detail, and detachably fits with the lower end portion of the handle unit 312. A contact is provided on the bottom surface of the concave holding unit 321. The contact comes into contact with a contact provided at the lower end portion of the handle unit 312 in a state in which the handle unit 312 is fit in the holding unit 321. Consequently, the contact of the handle unit 312 is connected to an AC power supply via a not-illustrated power supply cord provided in the holder 32. A battery 317 provided in the scanner 31 is charged. That is, the holder 32 also functions as a charging stand for charging the battery 317 of the scanner 31.

The work table 4 supports the supporting unit 21 of the POS terminal 2 and the holder 32 of the scanner 31. The holder 32 may be fixed and attached on the work table 4 or may be movably placed on the work table 4. In performing payment, the customer can place a shopping basket on the work table 4.

Figure 2:
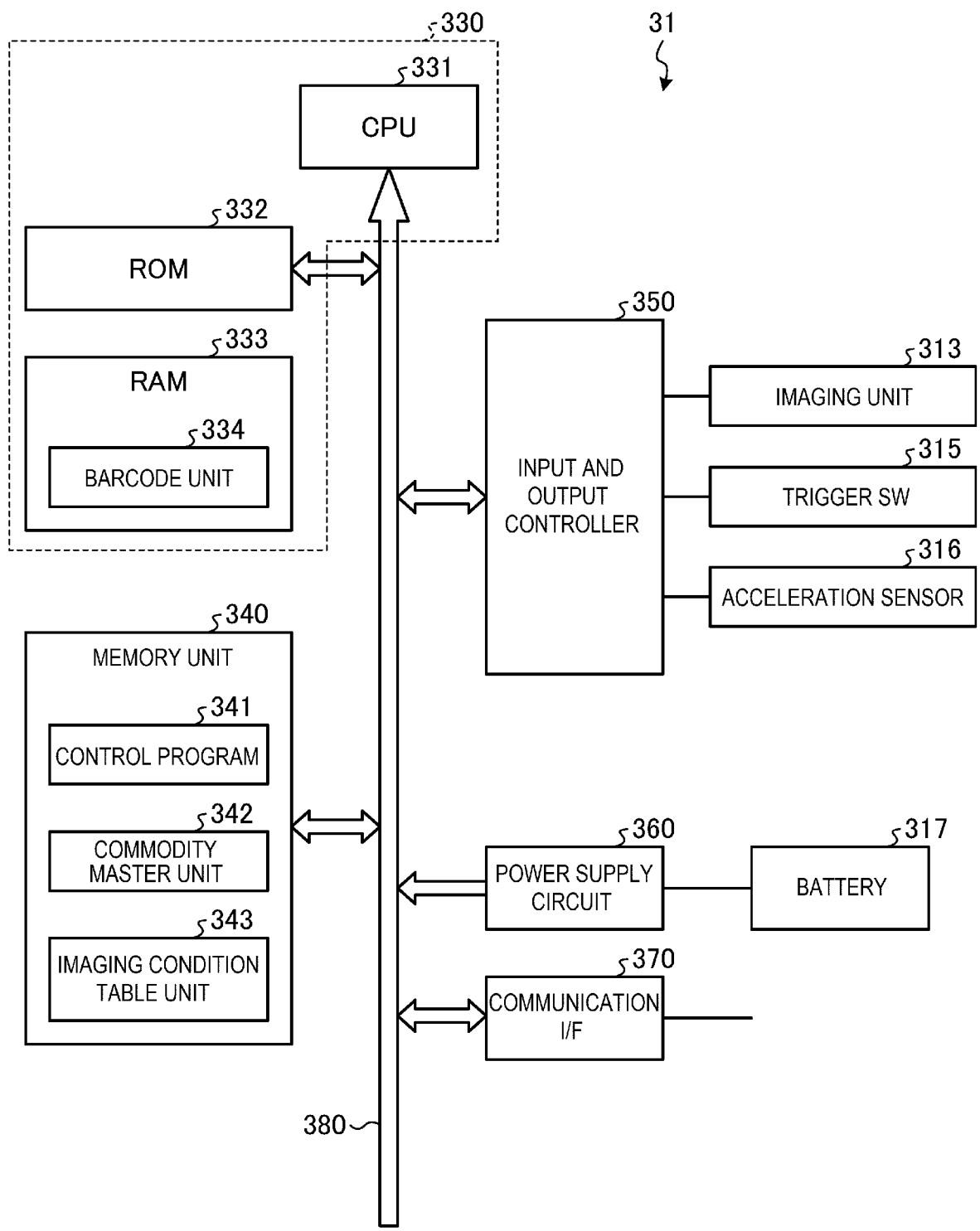
FIG. 2 is a block diagram illustrating a hardware configuration of a scanner in the first embodiment.

A hardware configuration of the scanner 31 is explained. FIG. 2 is a block diagram illustrating an example of the hardware configuration of the scanner 31.

The scanner 31 includes a control unit 330, a memory unit 340, an input and output controller 350, a power supply circuit 360, and a communication I/F (Interface) 370. The control unit 330, the memory unit 340, the input and output controller 350, the power supply circuit 360, and the communication I/F 370 are connected to one another via a bus 380.

The control unit 330 is configured by a computer including a CPU (Central Processing Unit) 331, a ROM (Read Only Memory) 332, and a RAM (Random Access Memory) 333. The CPU 331, the ROM 332, and the RAM 333 are connected to one another via the bus 380.

The CPU 331 controls the operation of the entire scanner 31. The ROM 332 stores various programs such as a program used for driving of the CPU 331 and various data. The RAM 333 includes a barcode unit 334. The barcode unit 334 is an area for storing a barcode read from an image captured by the imaging unit 313. The RAM 333 is used as a work area of the CPU 331. Various programs and various data stored in the ROM 332 and the memory unit 340 are loaded in the RAM 333. The CPU 331 operates according to a control program stored in the ROM 332 or the memory unit 340 and loaded in the RAM 333, whereby the control unit 330 executes various kinds of control processing for the scanner 31.

The memory unit 340 is configured by a storage device such as a HDD (Hard Disk Drive) or an SSD (Solid State Drive). The memory unit 340 includes a control program unit 341, a commodity master unit 342, and an imaging condition table unit 343. The control program unit 341 stores various control programs in addition to a control program for functioning as the scanner 31.

The commodity master unit 342 stores a commodity master. The commodity master is a master file that correlates, about commodities sold in a retail store where the POS terminal 2 is set, commodity codes for specifying the commodities and commodity information and stores the commodity codes and the commodity information. The commodity information is, for example, a commodity name, a price, and an image. Since the commodities sold in the retail store change every day, the commodity master is updated as appropriate by the POS terminal 2 or a not-illustrated store server connected via the communication I/F 370. The commodity master unit 342 may be provided in the POS terminal 2.

The imaging condition table unit 343 stores an imaging condition table. FIG. 3 is a diagram illustrating an example of a data structure of the imaging condition table unit 343. The imaging condition table sets first setting conditions and second setting conditions about a plurality of imaging parameters. The imaging parameters are an example of setting conditions relating to reading by the scanner 31. The first setting conditions are setting conditions for imaging parameters in a state in which the scanner 31 is held by the holder 32 (a first state). The second setting conditions are setting conditions for imaging parameters in a state in which the scanner 31 is detached from the holder 32 (a second state). In the second setting conditions, compared with the first setting conditions, the imaging parameters are set such that a reading distance by the scanner 31 is shorter. The reading distance is a distance from the reading window 314 at which the imaging unit 313 is capable of imaging a reading target object.

The first setting conditions are set in respective states of 1. a luminance value of illumination of the imaging unit 313 is higher, 2. shutter speed of the imaging unit 313 is lower, 3. a camera gain (sensitivity) of the imaging unit 313 is higher, and 4. a focal length of the imaging unit 313 is longer compared with the second setting conditions. In the first setting conditions, the reading distance is set to approximately 50 centimeters. The imaging unit 313 can image a reading target object present in a range in which the distance to the reading window 314 is approximately 0 to 50 centimeters. In this embodiment, imaging parameters of 1 to 4 described above in the first setting conditions are respectively set to values suitable for setting the reading distance to approximately 0 to 50 centimeters.

The second setting conditions are set in respective conditions of 1. a luminance value of illumination of the imaging unit 313 is lower, 2. shutter speed of the imaging unit 313 is higher, 3. a camera gain (sensitivity) of the imaging unit 313 is lower, and 4. a focal length of the imaging unit 313 is shorter compared with the first setting conditions. In the second setting conditions, the reading distance is set to approximately 20 centimeters. The imaging unit 313 can image a reading target object present in a range in which the distance to the reading window 314 is approximately 0 to 20 centimeters. In this embodiment, imaging parameters of 1 to 4 described above in the second setting conditions are respectively set to values suitable for setting the reading distance to approximately 0 to 20 centimeters.

In this embodiment, as a more preferred example, in the first setting conditions and the second setting conditions, the setting of all the imaging parameters is different. However, the setting of all the imaging parameters does not have to be differentiated. For example, only the luminance value of the illumination may be differentiated in the first setting conditions and the second setting conditions.

Referring back to FIG. 2, the input and output controller 350 is connected to the imaging unit 313, the trigger switch 315, and an acceleration sensor 316. The input and output controller 350 includes a function of an input and output interface for hardware connected to the input and output controller 350 and a function for controlling these kinds of hardware. Consequently, the control unit 330 is capable of transmitting and receiving information (data) to and from the imaging unit 313, the trigger switch 315, and the acceleration sensor 316 via the input and output controller 350 and is capable of controlling these kinds of hardware based on an instruction of the control unit 330.

The imaging unit 313 is incorporated in the main body unit 311 and configured by a camera including an imaging element such as a CMOS (Complementary Metal-Oxide Semiconductor) or a CCD (Charge Coupled Device). For example, if detecting that an object located in an imaging region of the imaging unit 313 moves, the imaging unit 313 starts imaging of the object. The imaging unit 313 can image a barcode attached to a commodity present within a predetermined distance from the reading window 314.

The trigger switch 315 is provided in the handle unit 312 and operated by the customer in the second state in which the scanner 31 is detached from the holder 32. The trigger switch 315 inputs an operation signal to the control unit 330 in the second state.

The acceleration sensor 316 is provided in, for example, the handle unit 312. The acceleration sensor 316 detects a change in movement of the scanner 31 that occurs in response to operation by the customer gripping the handle unit 312. If detecting a change in the movement of the scanner 31, the acceleration sensor 316 outputs a signal indicating to that effect to the control unit 330.

The power supply circuit 360 is connected to the battery 317. The power supply circuit 360 is a circuit that supplies electric power to the respective kinds of hardware of the scanner 31. For example, the power supply circuit 360 steps down a voltage supplied from the battery 317 to operating voltages of the respective kinds of hardware and supplies electric power to the respective kinds of hardware.

The communication I/F 370 is an interface for communicating with the POS terminal 2. The control unit 330 is connected to the POS terminal 2 via the communication I/F 370 to be capable of transmitting and receiving information (data) to and from the POS terminal 2.

Figure 4:
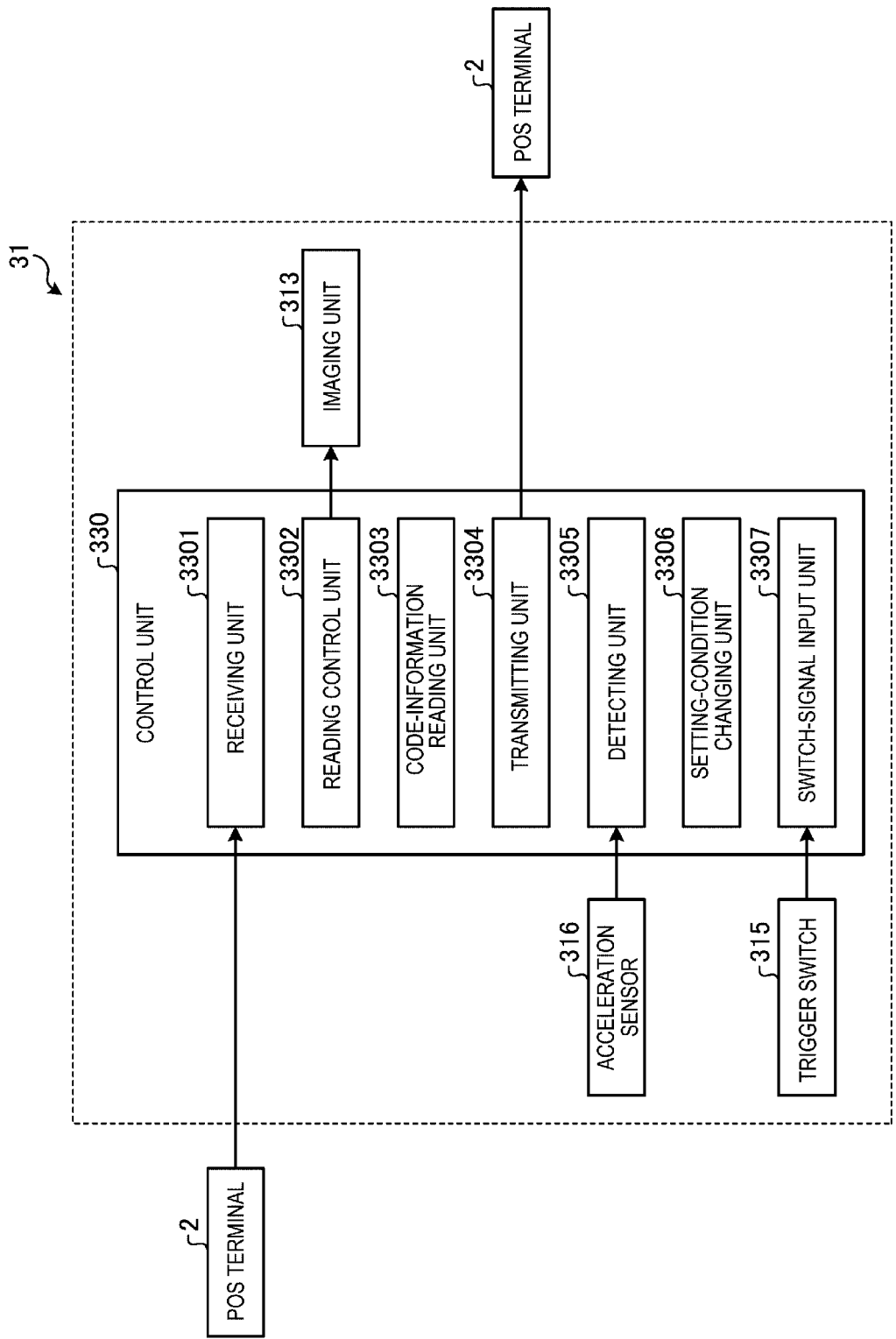
FIG. 4 is a block diagram illustrating a functional configuration of the scanner.

A functional configuration of the scanner 31 is explained. FIG. 4 is a block diagram illustrating an example of the functional configuration of the scanner 31. The CPU 331 operates according to a control program stored in the ROM 332 or the control program unit 341 of the memory unit 340, whereby the control unit 330 functions as a receiving unit 3301, a reading control unit 3302, a code-information reading unit 3303, a transmitting unit 3304, a detecting unit 3305, a setting-condition changing unit 3306, and a switch-signal input unit 3307. These functions may be configured by hardware.

The receiving unit 3301 receives a signal indicating a transaction start and a signal indicating a transaction end from the POS terminal 2. Specifically, if an input indicating that the customer performing payment operates the touch panel 222 or the keyboard 223 of the POS terminal 2 and starts a transaction before starting commodity registration is performed, the receiving unit 3301 receives a signal indicating the transaction start. If the customer ends payment in the POS terminal 2 and a receipt is dispensed, the receiving unit 3301 receives a signal indicating a transaction end from the POS terminal 2.

If the receiving unit 3301 receives the signal indicating the transaction start, the reading control unit 3302 controls the imaging unit 313 to start imaging. In the second state in which the scanner 31 is detached from the holder 32, the reading control unit 3302 starts the imaging on condition that the trigger switch 315 is turned on. If the receiving unit 3301 receives the signal indicating the transaction end, the reading control unit 3302 controls the imaging unit 313 to stop the imaging. Further, the reading control unit 3302 reads a barcode included in an image captured by the imaging unit 313 and stores the barcode in the barcode unit 334. Besides, the reading control unit 3302 controls the imaging unit 313 according to necessity.

The code-information reading unit 3303 reads, from a barcode stored in the barcode unit 334, code information indicated by the barcode. Specifically, the code-information reading unit 3303 decodes the barcode stored in the barcode unit 334 and reads a commodity code. Further, the code-information reading unit 3303 acquires, based on the read commodity code, referring to the commodity master unit 342, commodity information of a commodity specified by the commodity code. The POS terminal 2 may decode the barcode and acquire the commodity information referring to the commodity master unit 342.

The transmitting unit 3304 transmits the commodity code and the commodity information acquired by the code-information reading unit 3303 to the POS terminal 2. If the commodity master is provided in the POS terminal 2 and the acquisition of the commodity information is performed by the POS terminal 2, the transmitting unit 3304 transmits the commodity code read by the code-information reading unit 3303 to the POS terminal 2. If the POS terminal 2 decodes the barcode and acquires the commodity information referring to the commodity master unit 342, the transmitting unit 3304 transmits the barcode itself to the POS terminal 2.

The detecting unit 3305 detects the first state in which the scanner 31 is held by the holder 32 and the second state in which the scanner 31 is detached from the holder 32. Specifically, if a signal indicating that the scanner 31 is not moving is input from the acceleration sensor 316, the detecting unit 3305 determines that the scanner 31 is kept held by the holder 32 and detects the first state. If an signal indicating that the scanner 31 is moving is input from the acceleration sensor 316, the detecting unit 3305 determines that the scanner 31 is detached from the holder 32 and operated by the customer and detects the second state.

If the detecting unit 3305 detects the second state, the setting-condition changing unit 3306 sets setting conditions relating to the reading by the scanner 31 such that the reading distance of the scanner 31 is shorter than the reading distance in the first state. Specifically, if the detecting unit 3305 detects the second state, the setting-condition changing unit 3306 sets, referring to the imaging-condition table unit 343, the imaging parameters illustrated in FIG. 3 to the second setting conditions. Consequently, the reading distance of the scanner 31 decreases. If the detecting unit 3305 detects the first state, the setting-condition changing unit 3306 sets, referring to the imaging-condition table unit 343, the imaging parameters illustrated in FIG. 3 to the first setting conditions. Consequently, the reading distance of the scanner 31 increases.

The switch-signal input unit 3307 receives an operation signal from the trigger switch 315. If the trigger switch 315 is turned on by the customer, the switch-signal input unit 3307 receives an operation signal.

Figure 5:
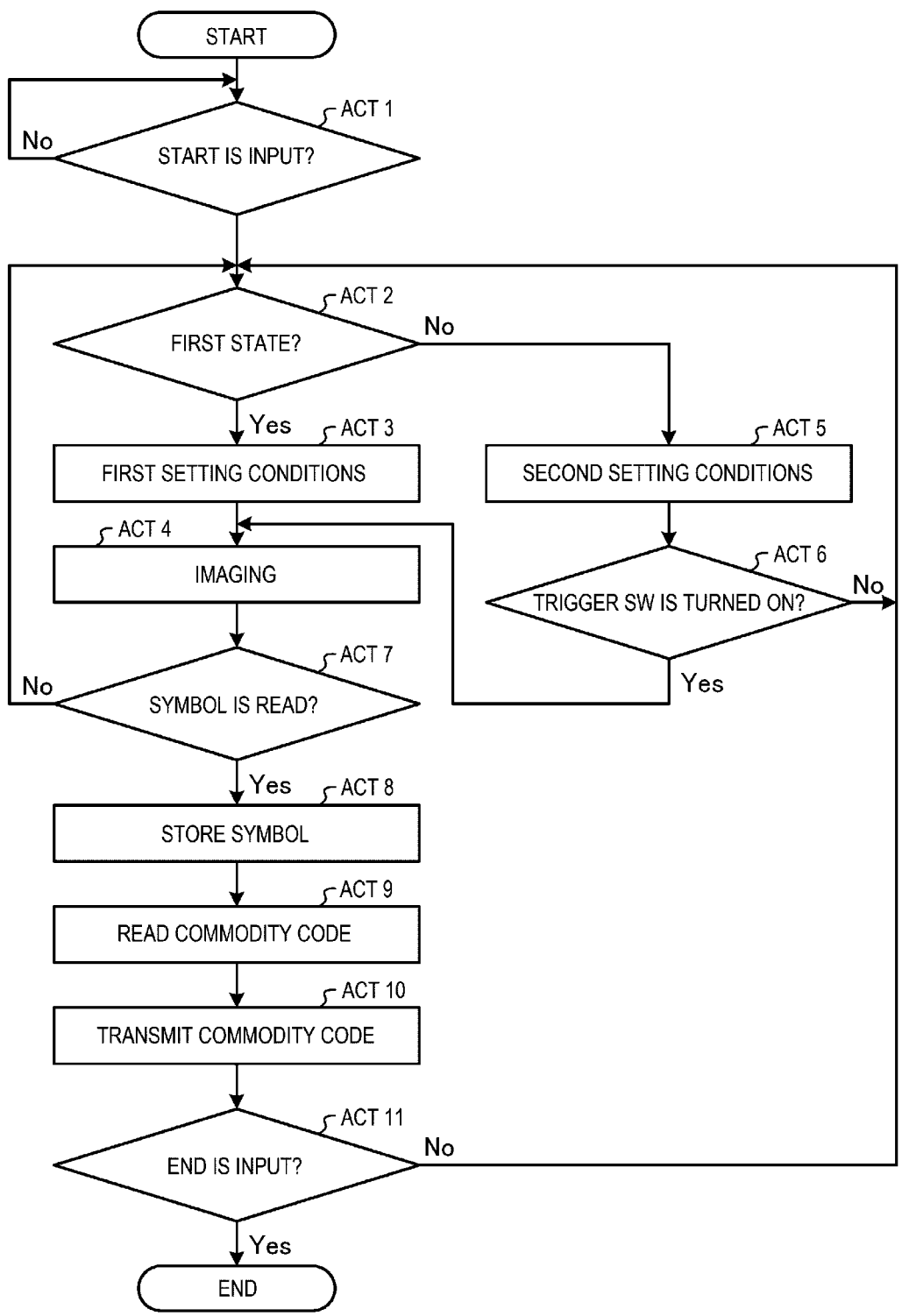
FIG. 5 is a flowchart illustrating reading processing by a control unit of the scanner.

Processing by the control unit 330 of the scanner 31 is explained. FIG. 5 is a flowchart illustrating an example of reading processing executed by the control unit 330.

The control unit 330 determines whether a signal indicating a transaction start is input to the receiving unit 3301 from the POS terminal 2 (ACT 1). That is, the control unit 330 determines whether operation for staring a transaction is performed on the POS terminal 2 by a customer purchasing a commodity. If the signal indicating the transaction start is not input (N in ACT 1), the control unit 330 returns to the processing in ACT 1 and stays on standby. If the signal indicating the transaction start is input (Y in ACT 1), the control unit 330 determines whether the detecting unit 3305 detects the first state (ACT 2).

If the detecting unit 3305 detects the first state (Y in ACT 2), the setting-condition changing unit 3306 sets the imaging parameters to the first setting conditions referring to the imaging condition table unit 343 (ACT 3). The reading control unit 3302 controls the imaging unit 313 to start imaging (ACT 4). That is, the control unit 330 determines that the scanner 31 is used as a stationary scanner held by the holder 32 and increases the reading distance of the scanner 31.

If the detecting unit 3305 does not detect the first state in the processing in ACT 2 (N in ACT 2), in other words, if the detecting unit 3305 detects the second state, the setting-condition changing unit 3306 sets the imaging parameters to the second setting conditions referring to the imaging condition table unit 343 (ACT 5). Subsequently, the control unit 330 determines whether a signal is input to the switch-signal input unit 3307 from the trigger switch 315 (ACT 6).

If a signal is not input from the trigger switch 315 (N in ACT 6), the control unit 330 returns to the processing in ACT 2. If a signal is input from the trigger switch 315 (Y in ACT 6), the control unit 330 shifts to processing in ACT 4. The reading control unit 3302 controls the imaging unit 313 to start imaging. In the second state, it is determined that the customer is holding and moving the scanner 31. Therefore, to prevent the customer from carelessly imaging a barcode attached to a commodity, the imaging unit 313 starts the imaging on condition that the trigger switch 315 is turned on.

Subsequently to the processing in ACT 4, the control unit 330 determines whether the reading control unit 3302 reads a barcode from an image captured by the imaging unit 313 (ACT 7). If the reading control unit 3302 does not read a barcode (N in ACT 7), the control unit 330 returns to the processing in ACT 2. If the reading control unit 3302 reads a barcode (Y in ACT 7), the reading control unit 3302 stores the read barcode in the barcode unit 334 (ACT 8).

Subsequently, the code-information reading unit 3303 decodes the barcode stored in the barcode unit 334 and reads a commodity code (ACT 9). The transmitting unit 3304 transmits the commodity code to the POS terminal 2 (ACT 10). In this embodiment, the code-information reading unit 3303 acquires commodity information corresponding to the read commodity code referring to the commodity master unit 342. The transmitting unit 3304 transmits the commodity information to the POS terminal 2 together with the commodity code.

Subsequently to the transmission of the commodity code by the transmitting unit 3304, the control unit 330 determines whether a signal indicating a transaction end is input to the receiving unit 3301 from the POS terminal 2 (ACT 11). If the signal indicating the transaction end is input to the receiving unit 3301 (Y in ACT 11), the control unit 330 determines that a payment process in the POS terminal 2 ends and ends a reading process. If the signal indicating the transaction end is not input to the receiving unit 3301 (N in ACT 11), the control unit 330 returns to the processing in ACT 2 and repeats the processing in ACT 2 and subsequent acts.

The reading device 3 having the configuration explained above is usually used in the first state, in other words, uses the scanner 31 as the stationary scanner. In this case, a reading range of the scanner 31 is fixed. A commodity code is read only if a commodity to be purchased by the customer is located in the reading range. Accordingly, it is least likely that the scanner 31 erroneously reads a commodity code of another commodity, which is not the commodity to be purchased by the customer, for example, a commodity stored in a shopping cart of another customer or a commodity displayed on a shelf set near the POS terminal 2.

On the other hand, in reading a commodity code from a barcode attached to a heavy commodity, the reading device 3 is used in the second state, in other words, uses the scanner 31 as a handy scanner. This is because the customer does not have to bring the heavy commodity to the reading range of the stationary scanner. In this case, it is likely that, while the customer is moving the scanner 31 in order to direct the reading window 314 of the scanner 31 to the barcode attached to the commodity, another commodity is located in the reading range of the scanner 31 and the scanner 31 erroneously reads a commodity code of a commodity not to be purchased by the customer. In particular, if a commodity code of a commodity placed in a position away from the work table 4 is read, the wrong reading of the commodity code tends to occur.

However, the reading device 3 in this embodiment includes the detecting unit 3305 that detects the first state in which the scanner 31 is held by the holder 32 and the second state in which the scanner 31 is detached from the holder 32 and the setting-condition changing unit 3306 that, if the detecting unit 3305 detects the second state, sets the setting conditions relating to the reading by the scanner 31 such that the reading distance of the scanner 31 is shorter than the reading distance in the first state.

Accordingly, in the first state in which wrong reading of a commodity code is less likely, by increasing the reading distance, it is possible to read a commodity code even if a commodity attached with a barcode is not brought close to the reading window 314 more than necessary. Therefore, operability is satisfactory. In the second state in which wrong reading of a commodity code is likely, the reading distance is reduced to suppress careless reading of the commodity code. Therefore, it is possible to perform accurate reading of the commodity code.

In addition, in the second state, the reading device 3 in this embodiment executes reading of a commodity code if the customer using the scanner 31 turns on the trigger switch 315. Accordingly, in the second state in which wrong reading of a commodity code is likely, it is possible to further suppress careless reading of the commodity code.

The scanner 31 may read information concerning an image captured by the imaging unit 313 rather than reading information indicated by a code symbol attached to a commodity or the like. For example, in the scanner 31, image data captured by the imaging unit 313 may be transmitted to the POS terminal 2 by the transmitting unit 3304. The POS terminal 2 may specify a commodity using an object recognition technique. In this case, the image data is an example of the information concerning the image. In the scanner 31, the code-information reading unit 3303 may read a commodity code from image data using the object recognition technique. The transmitting unit 3304 may transmit the commodity code to the POS terminal 2. In this case, the commodity code is an example of the information concerning the image.

That is, it is also possible that the reading device 3 includes the scanner 31 that reads information concerning an image captured by the imaging unit 313, the holder 32 that detachably holds the scanner 31, the detecting unit 3305 that detects the first state in which the scanner 31 is held by the holder 32 and the second state in which the scanner 31 is detached from the holder 32, and the setting-condition changing unit 3306 that, if the detecting unit 3305 detects the second state, sets setting conditions relating to the reading by the scanner 31 such that the reading distance of the scanner 31 is shorter than the reading distance in the first state. With this configuration as well, operability is satisfactory in the first state and it is possible to perform accurate reading of the information concerning the image in the second state.

A second embodiment is explained. Whereas the scanner 31 in the first embodiment is a scanner of a form for capturing an image of a barcode and reading a commodity code, the scanner 31 in the second embodiment is a scanner of a form for irradiating a barcode with light and reading a commodity code with reflected light of the light. Only differences from the first embodiment are explained below. Redundant explanation is omitted.

Figure 6:
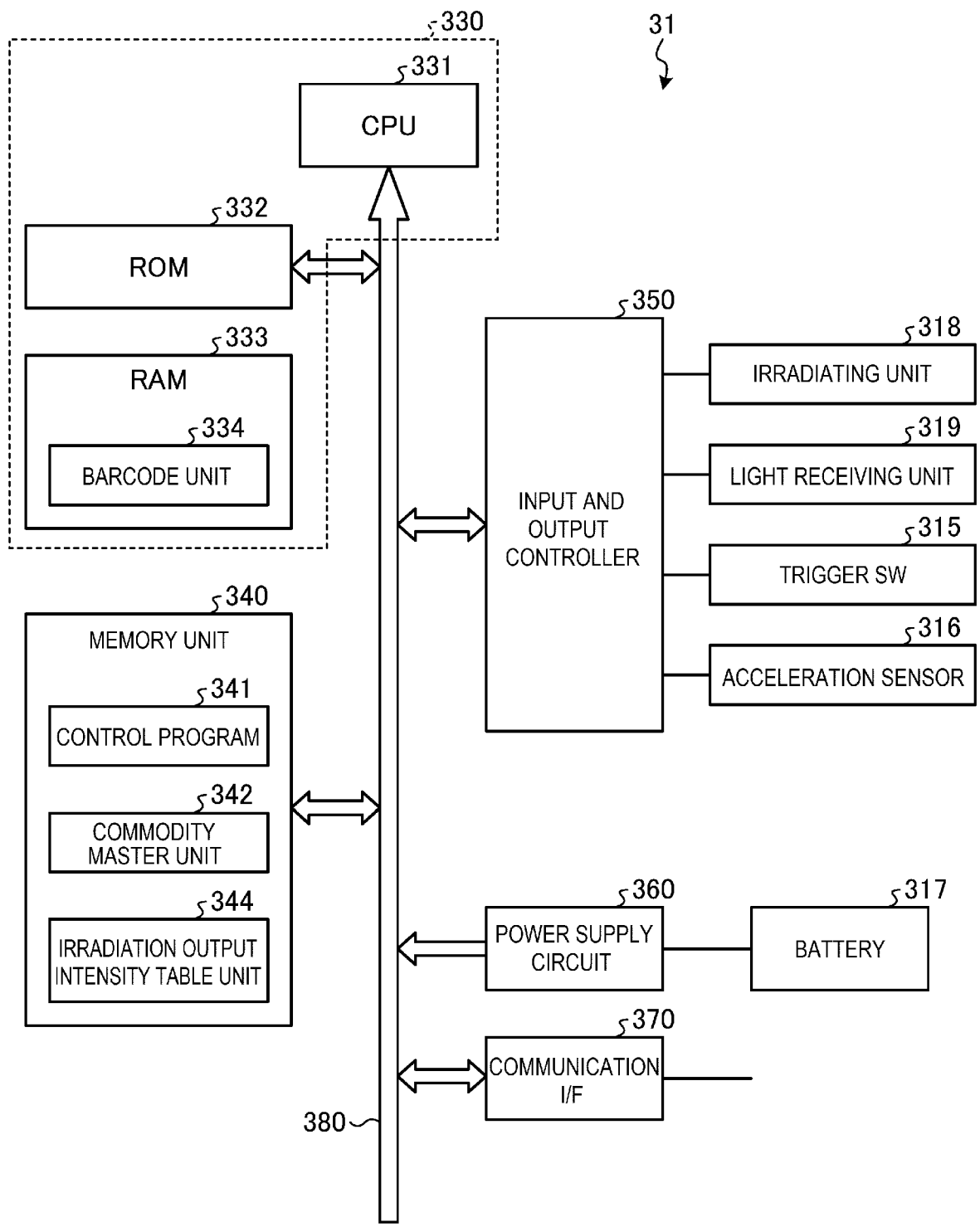
FIG. 6 is a block diagram illustrating a hardware configuration of a scanner in a second embodiment.

FIG. 6 is a block diagram illustrating a hardware configuration of the scanner 31 in the second embodiment. The memory unit 340 of the scanner 31 includes an irradiation output intensity table unit 344.

The irradiation output intensity table unit 344 stores an irradiation output intensity table. FIG. 7 is a diagram illustrating an example of a data structure of the irradiation output intensity table unit 344. The irradiation output intensity table sets a first setting condition and a second setting condition about output intensity of an irradiating unit 318 (hereinafter simply referred to as output intensity). The output intensity can also be referred to as luminous intensity representing brightness of light emitted by the irradiating unit 318 and is an example of a setting condition relating to the reading by the scanner 31.

As in the first embodiment, the first setting condition is for output intensity in a first state and is set such that a reading distance is approximately 50 centimeters. The second setting condition is a setting condition for output intensity in a second state and is set such that the reading distance is approximately 50 centimeters.

Referring back to FIG. 6, the input and output controller 350 is connected to the irradiating unit 318 and a light receiving unit 319. Consequently, the control unit 330 is capable of transmitting and receiving information (data) to and from the irradiating unit 318 and the light receiving unit 319 via the input and output controller 350 and is capable of controlling these kinds of hardware based on an instruction of the control unit 330.

The irradiating unit 318 is configured by, for example, a red LED or a laser diode. Output intensity of the irradiating unit 318 is controlled by the reading control unit 3302. The light receiving unit 319 is configured by, for example, a CCD image sensor or a photodiode and receives reflected light of light emitted by the irradiating unit 318. The code-information reading unit 3303 reads a commodity code indicated by a barcode based on the reflected light received by the light receiving unit 319.

In the second embodiment, as in the first embodiment, in the first state in which wrong reading of a commodity code is less likely, by increasing the reading distance, it is possible to read a commodity code even if a commodity attached with a barcode is not brought close to the reading window 314 more than necessary. Therefore, operability is satisfactory. In the second state in which wrong reading of a commodity code is likely, the reading distance is reduced to suppress careless reading of the commodity code. Therefore, it is possible to perform accurate reading of the commodity code. In addition, in the second embodiment, the output intensity of the irradiating unit 318 only has to be changed based on a detection result of the detecting unit 3305. Therefore, a configuration is not complicated.

The embodiments are explained above. However, the embodiments are presented as examples and are not intended to limit the scope of the invention. These new embodiments can be implemented in other various forms.

Various omissions, substitutions, and changes can be made without departing from the spirit of the invention.

In the embodiments, the control program executed by the scanner 31 may be provided while being recorded in a computer-readable recording medium such as a CD-ROM. The control program executed by the scanner 31 may be stored on a computer connected to a network such as the Internet and provided by being downloaded through the network. Further, the control program may be provided through the network such as the Internet.

What is claimed is:

1. A reading device, comprising:
a scanner configured to read code information indicated by a code symbol;
a holder configured to detachably hold the scanner;
a detecting component configured to detect a first state in which the scanner is held by the holder and a second state in which the scanner is detached from the holder; and
a setting-condition changing component configured to, if the detecting component detects the second state, set setting conditions relating to the reading by the scanner such that a reading distance of the scanner is shorter than a reading distance in the first state.

2. The reading device according to claim 1, wherein
the scanner reads the code information based on an image of the code symbol captured by an imaging component, and
the setting-condition changing component changes imaging conditions for the imaging component.

3. The reading device according to claim 1, wherein
the scanner receives reflected light of light with which the code symbol is irradiated by an irradiating component and reads the code information based on a result of the light reception, and
the setting-condition changing component changes output intensity of the irradiating component.

4. The reading device according to claim 1, wherein
the scanner is a hand-held scanner.

5. A POS terminal comprising the reading device according to claim 1.

6. A reading device, comprising:
a scanner configured to read information concerning an image captured by an imaging component;
a holder configured to detachably hold the scanner;
a detecting component configured to detect a first state in which the scanner is held by the holder and a second state in which the scanner is detached from the holder; and
a setting-condition changing component configured to, if the detecting component detects the second state, set setting conditions relating to the reading by the scanner such that a reading distance of the scanner is shorter than the reading distance in the first state.

7. The reading device according to claim 6, wherein
the setting-condition changing reading changes imaging conditions for the imaging component.

8. The reading device according to claim 6, wherein
the setting-condition changing component changes output intensity of the irradiating component.

9. The reading device according to claim 6, wherein
the scanner is a hand-held scanner.

10. A POS terminal comprising the reading device according to claim 6.

11. A commodity data registration system, comprising:
a reading device configured to read code information from a code symbol attached to a commodity; and
a registration device configured to perform registration of commodity data based on the code information read by the reading device,
the reading device comprising:
a scanner configured to read the code information indicated by the code symbol;
a holder configured to detachably hold the scanner;
a detecting component configured to detect a first state in which the scanner is held by the holder and a second state in which the scanner is detached from the holder; and
a setting-condition changing component configured to, if the detecting component detects the second state, set setting conditions relating to the reading by the scanner such that a reading distance of the scanner is shorter than the reading distance in the first state.

12. The commodity data registration system according to claim 11, wherein
the scanner reads the code information based on an image of the code symbol captured by an imaging component, and
the setting-condition changing component changes imaging conditions for the imaging component.

13. The commodity data registration system according to claim 11, wherein
the scanner receives reflected light of light with which the code symbol is irradiated by an irradiating component and reads the code information based on a result of the light reception, and
the setting-condition changing component changes output intensity of the irradiating component.

14. The commodity data registration system according to claim 11, wherein
the scanner is a hand-held scanner.

15. The commodity data registration system according to claim 11, wherein
the commodity data registration system is a POS terminal.

16. A method of controlling a reading device including a scanner configured to read code information indicated by a code symbol and a holder configured to detachably hold the scanner, comprising:
detecting a first state in which the scanner is held by the holder and a second state in which the scanner is detached from the holder; and
if the second state is detected, setting conditions relating to the reading by the scanner such that a reading distance of the scanner is shorter than the reading distance in the first state.

17. The method according to claim 16, further comprising:
the scanner reading the code information based on an image of the code symbol captured by an imaging component; and
changing imaging conditions for the imaging component.

18. The method according to claim 16, further comprising:
receiving reflected light of light with which the code symbol is irradiated by an irradiating component and reading the code information based on a result of the light reception; and
changing output intensity of the irradiating component.

* * * * *